United States Patent [19]

Killian

[11] 4,193,019

[45] Mar. 11, 1980

[54] DIRECT DIGITAL CONTROL DEVICE

[76] Inventor: Henry R. Killian, 915 Longview Dr., Sugarland, Tex. 77478

[21] Appl. No.: 837,681

[22] Filed: Sep. 29, 1977

Related U.S. Application Data

[63] Continuation-in-part of Ser. No. 574,294, May 5, 1975, abandoned.

[51] Int. Cl.² .................................................. H02K 7/10
[52] U.S. Cl. ........................................ 318/13; 318/603; 318/673
[58] Field of Search ................. 318/13, 603, 673, 490, 318/638, 625

[56] References Cited

U.S. PATENT DOCUMENTS

| | | | |
|---|---|---|---|
| 2,867,724 | 1/1959 | Olson | 318/603 |
| 3,308,277 | 3/1967 | Baynes | 318/603 |
| 3,535,607 | 10/1970 | Haslehurst | 318/638 |
| 3,538,413 | 11/1970 | Baylis et al. | 318/13 |

Primary Examiner—Gene Z. Rubinson
Assistant Examiner—Eugene S. Indyk
Attorney, Agent, or Firm—Melvin R. Stidham

[57] ABSTRACT

A digital control device wherein both an input drive, which, in response to signal pulses, produces a specific increment rotation of an output drive, and a feedback drive, which is driven in proportion to the incremental rotation so produced, are connected to drive a differential gear device, the output of which drives a pair of multi-stage, intermittent drive counting devices, one in a forward direction, the other in reverse. Movement of the last stages of such devices are conditioned to activate said output drive and they are set in null positions wherein a very few advancing increments of movement of the first stage will generate incremental movement of all subsequent stages. When the input drive starts, the last stage of only the advancing counter will advance and activate the output drive in a direction to oppose the input. Return of the counters to null positions will deactivate the output drive.

11 Claims, 8 Drawing Figures

DIRECT DIGITAL CONTROL DEVICE

RELATED APPLICATION

This application is a continuation-in-part of my copending application Ser. No. 574,294 filed May 5, 1975 for "Direct Digital Control Device" now abandoned.

BACKGROUND OF THE INVENTION

Machine positioning devices presently in use generally include expensive and complex electronic circuitry and systems which require a high level of technical skills to service and maintain. Moreover, such systems often have limited resolution capabilities and limited positioning capabilities, and they are often upset by temporary power loss.

OBJECTS OF THE INVENTION

It is an object of this invention to provide a simple, low-cost and highly reliable positioning system.

It is a further object of this invention to provide a low-cost positioning device that will accept low power digital signals from a control device and accurately position any powered device with extremely fine positioning accuracy.

Other objects and advantages of this invention will become apparent from the description to follow when read in conjunction with the accompanying drawings.

BRIEF SUMMARY OF THE INVENTION

In carrying out this invention I provide a conventional differential drive mechanism such as a differential gear box the output of which drives in opposite directions, a pair of multi-wheeled counting mechanisms. Such mechanisms, which are exemplified by a conventional decade counter, have interconnected, progressively driven wheels wherein a resolution of each stage wheel generates a fractional revolution of the next stage wheel. The differential gear box is driven, initially in one direction by an incremental input, such as a stepping motor driven in response to pulses received from an input control medium such as a computer, and then, when the output drive motor is energized, the differential gear is driven by a feedback drive from some component of the output drive. Depending upon the direction of input drive, one of the counting devices is driven in the forward, or adding, direction by the differential gear and the other in the reverse, or subtracting direction. In null position, both counting devices are set so that just a few additive increments of movement of the first stage will produce an increment of movement of the last stage. For example, if two four digit decade counters were both set to read 0998, it is obvious that after two increments of movement to 1000, the last stage of one counting device will turn additively to its next position while the other counting device is subtracting to 0996, leaving its final stage unchanged at zero. In the case of a four digit decade counter, the last stage will remain fixed through nearly 1000 increments of movement of the first stage.

A switch activating device is placed at the next advanced position on the last stage of each counting device whereby that device which advances, dependent upon the direction of the drive from the incremental input, will advance the last stage to such next advanced position and cause the switch activating device on that particular counting device to energize the prime mover in the desired direction whereby the feedback drive is activated by the output to drive the differential gear in opposition to the incremental input. Hence, the differential gear delivers a net output which tends to reduce, or at least retard, further departure of the counting devices from their null positions. When the incremental input has completed the number of increments dictated by the control source it is stopped and, thereafter, the differential gear box is driven solely by the output drive until the movement so dictated is completed. At that point, the counting devices will have returned to their null positions and the switch means released. The incremental input may be a stepping motor driven in response to pulses or it may simply be a handwheel which an operator turns through a desired number of increments.

DESCRIPTION OF A PREFERRED EMBODIMENT

The Embodiment of FIGS. 1 to 4

Figure 1:
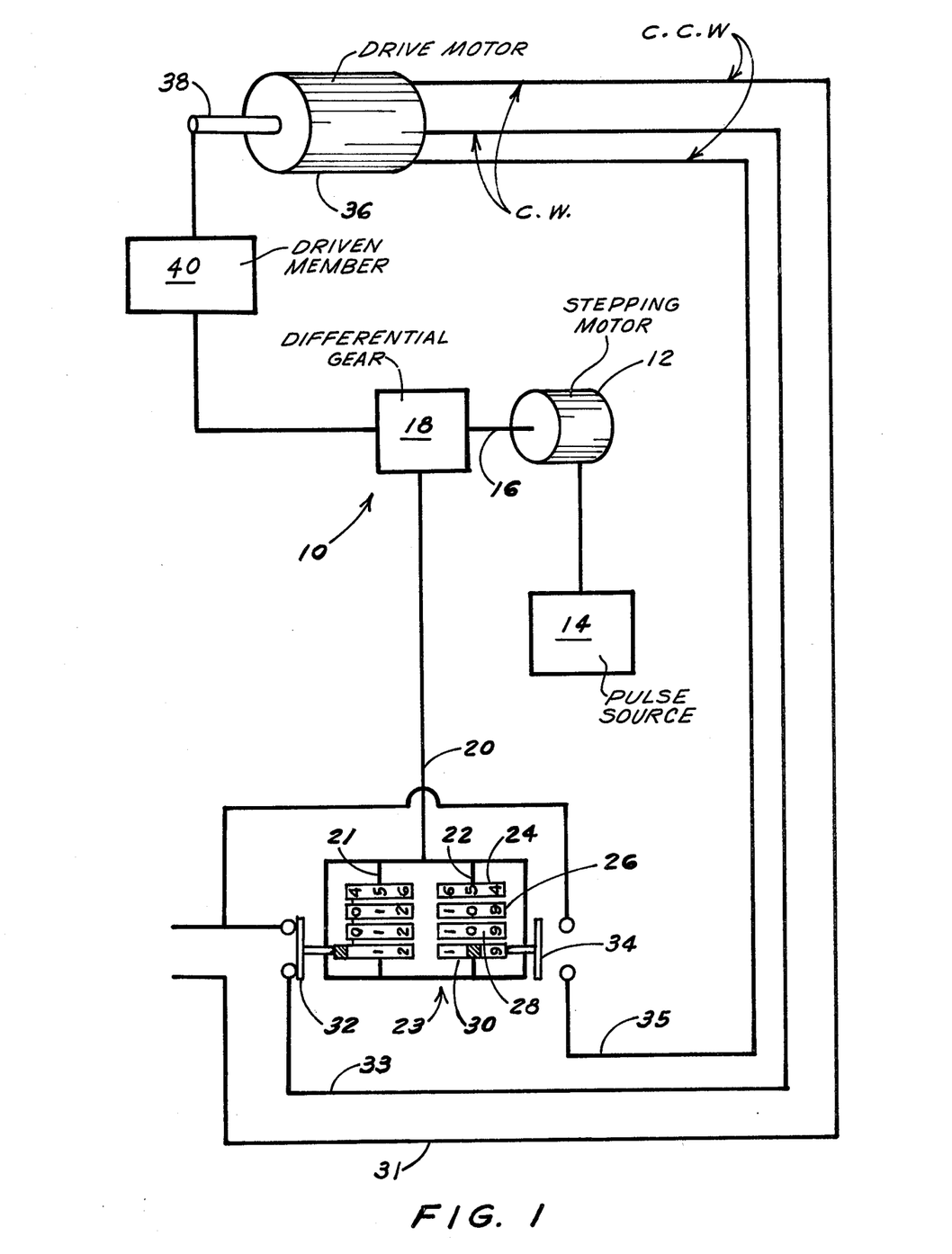
FIG. 1 is a schematic diagram of the direct digital control system of this invention.

Referring more particularly to FIG. 1, the direct digital controller device 10 of this embodiment includes a stepping motor 12 which is capable of producing a bi-directional rotary output in fixed increments in response to a low power electrical pulse delivered from a suitable source 14, such as a computer. The incremental output of the stepping motor 12 is delivered by shaft 16 to a differential gear device 18.

The output of the differential gear box 18 is, in turn, delivered at 20 to the shafts 21 and 22 of a pair of progressive intermittent drives 23, such as a conventional decade counter mechanism wherein a complete revolution of the first stage 24, i.e. the units wheel in the case of a decade counter advances the second stage 26, a fixed increment, which in the case of a decade counter, is one-tenth of a revolution. Similarly, a complete revolution of the second stage 26 advances the third stage 28 an increment, and a complete revolution of the third stage wheel advances the fourth stage 28 through a fractional revolution increment.

In the counter assembly 23, the counters 21 and 22 are driven in opposite directions for purposes hereafter to be described, whereby one counter shaft 21 or 22 will produce an ascending count while the other will subtract by increments. Also as will be described, when one of the counter shafts 21 or 22 is turned to a fixed increment, one of two switches 32 and 34, depending on the direction of drive from the differential gear box 18, will close to energize a drive motor 36. The direction of rotation of the drive 36, i.e. clockwise (C.W.) or counterclockwise (C.C.W.) depends on which of the switches 32 and 34 is closed to complete a circuit through conductors 32 and 33 or 31 and 35, respectively. This in turn is dependent upon the direction of rotation of the differential gear box 18 and is designed to rotate the drive motor 36 in opposition thereto.

The output 38 of the drive motor 36 moves a driven mechanism 40 and the feedback 40a from the output 38 or from the driven member 40 itself is delivered to the differential gear box 18 in opposition to the output of the stepping motor 12. As a result, the output at 20 of the differential gear box 18 prepresents the difference between the outputs of the stepping motor 12, representing the signal input, and the drive motor 36 or driven member 40, representing the feedback 40a. When all the pulses from the signal source 14, which have been delivered to the stepping motor 12 have been answered by the drive motor 36 the counting devices 21 and 22 will have returned to their original null positions whereby both switches 32 and 34 will again be an open condition as will be hereinafter described.

Figure 2:
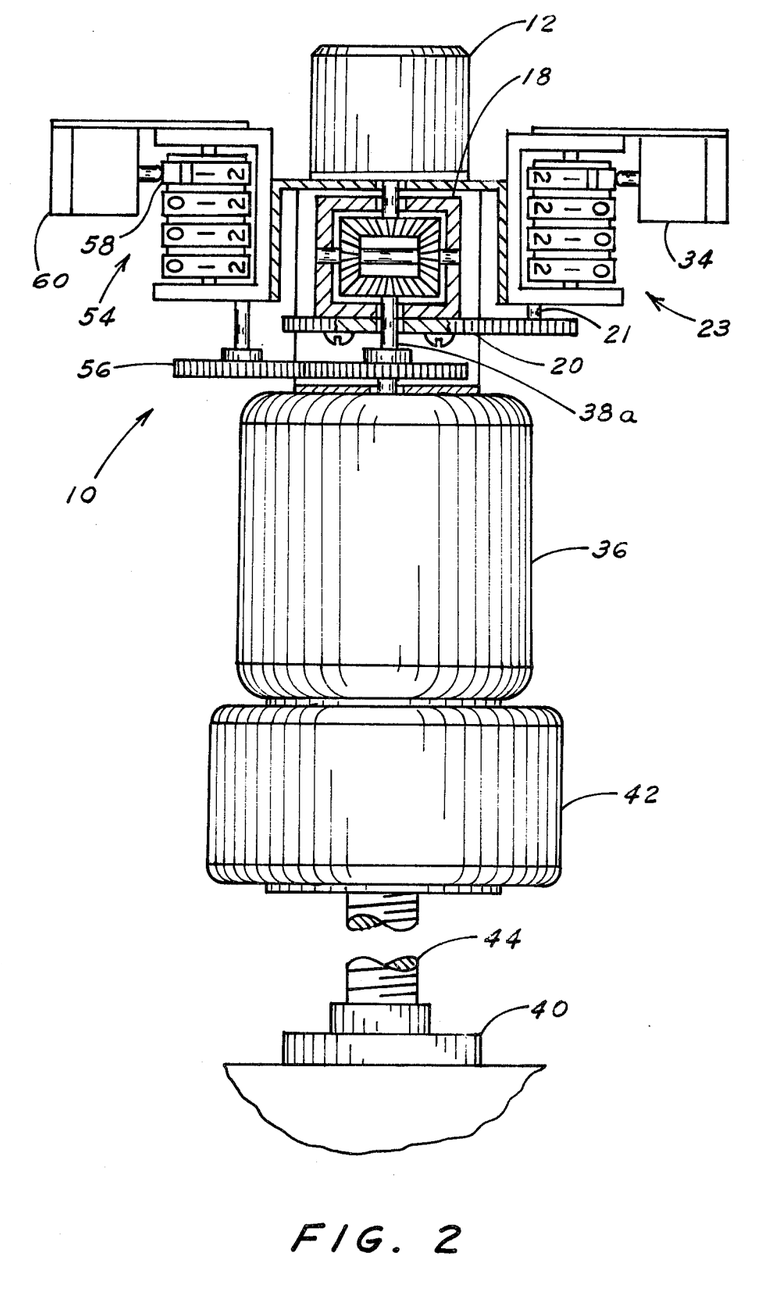
FIG. 2 is an elevation view, partially in section showing a form of drive feedback.

Referring now to FIG. 2 there is shown an arrangement wherein the feedback to the differential mechanism 18 is directly from the drive motor 36. As there shown, the stepping motor 12 drives the differential gear box 18 and, when energized by the appropriate switch 32 or 34 actuated by the counting mechanism 23, the drive motor also drives the differential gear, though in opposition to the stepping motor. The gear box 18 may be so driven directly by means of an extension 38a of the drive motor output shaft. Simultaneously, the drive motor 36 is performing its principal work by delivering an output through a reduction gear assembly 42 to rotate the drive output shaft which may be a threaded member 44 to move the driven member 40 threaded on the shaft.

Figure 3:
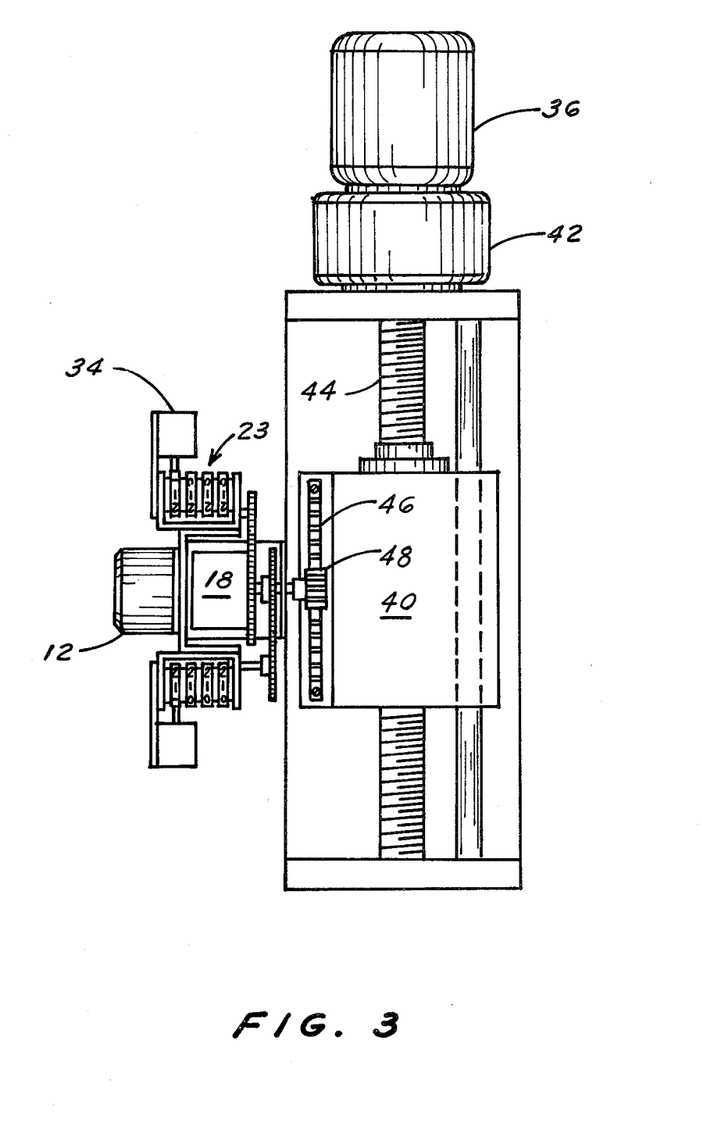
FIG. 3 is an elevation view showing another means of feedback.

In the embodiment of FIG. 3, the feedback is taken from the driven member 40 itself. There, the differential drive 18 is driven as previously described from the stepping motor 12, and when energized, the drive motor 36 moves the driven member 40 through the medium of the screw 44. In this embodiment, a rack 46 may be secured on the driven member whereby a pinion 48 is rotated to drive the differential gear box 18 as the driven member 40 is moved along its directed path. As previously described, when the signal from the stepping motor 12 has been completely answered by the pinion 48, the counters have returned to their null positions.

Figure 4:
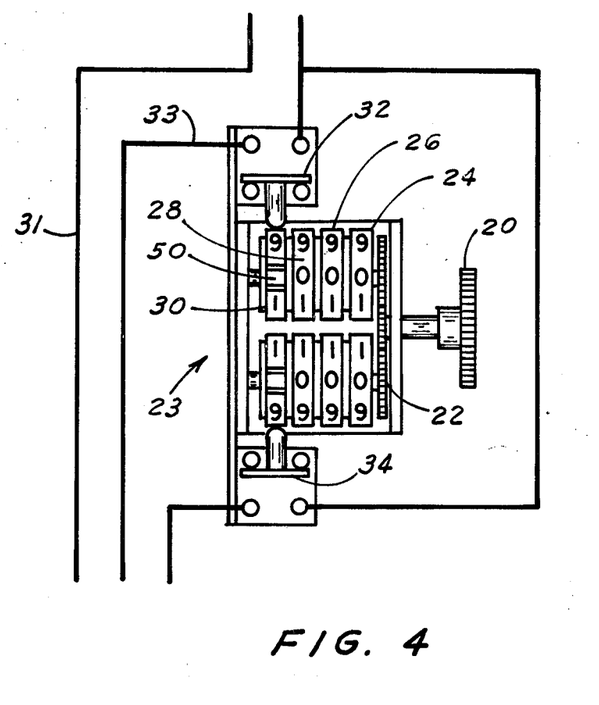
FIGS. 4 and 5 are enlarged views of a counting mechanism comprising a principal feature of a digital control device.
Figure 5:
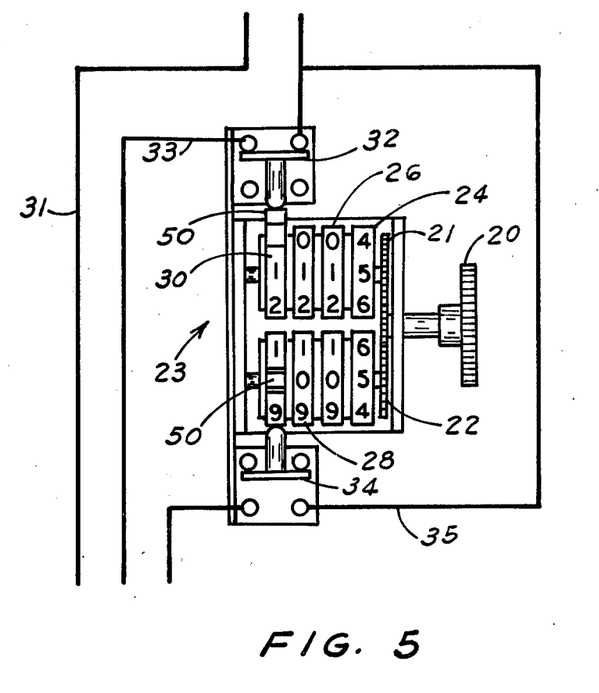

Referring now to FIGS. 4 and 5, the null positions for both counters 21 and 22 are preferably that wherein a very few increments of movement of the first stage 24 will cause the last stage to advance. Thus, for example, if in the case of decade counters, both were set to read 9999, and the input gear 20 were to rotate through 180 degrees, i.e. one half revolution of the first stage units counter wheel 24, both counters would shift through five increments, but in opposite directions. That is, one counter will shift from 9999 to 0000, 0001, 0002, 0003, and 0004 while the other counter will shift from 9999 to 9998, 9997, 9996, 9995 and 9994.

The significant feature in the action just described is that on one counting device, the last stage will remain stationary while on the other counter, the thousands wheel 30 will advance from its null position to the next position with the first increment of movement of the first stage. Accordingly, there is carried on the last stage wheel 30 of each counters, at the position next succeeding its null position, a cam 50 which, when positioned under the appropriate switch 32 or 34 closes that switch and energizes that drive motor 36 (FIG. 1) in the direction determined by the particular switch 32 or 34 which it closes.

Thus, if a particular increment of movement of the driven member 40 is desired, an appropriate number of low power pulses is fed from the computer or other source 14 to the stepping motor 12 and an immediate incremental output is delivered from the stepping motor to the differential gear box 18, the output of which will be delivered at 20 to the counter mechanism causing the counters 21 and 22 to move in opposite directions from their null positions. Immediately, as previously described, the last stage of one will move through an increment to its next advanced position, positioning the cam 50 on the counting device to close an appropriate switch 32 or 34 and commence drive of the drive motor 36 in the direction dictated thereby. As previously described, the output will be fed back from some component of the drive to the differential gear box 18 whereby the output delivered at 20 by the differential will be the difference between the drives of the stepping motor 12 and the drive motor 36. When the stepping motor has completed its input drive to the differential gear, it will stop and only the drive motor will be delivering an output. When the drive motor has fully performed, the counters will both have returned to their null positions and the switch previously closed will drop off the cam.

In the illustrated embodiment of this invention, it is merely necessary that the rotation of the stepping motor 12 in response to a single electrical pulse be equal to or less than that required to produce a one count movement of the counters. Otherwise, the positioning accuracy of the counters would be limited by the stepping motor rather than by the counting system.

It can readily be seen that the null positions of the two counters 21 and 22 may be just as easily set so that it takes two or more increments of the first stage to initiate the output drive, i.e. at 9998 or 9997 in the case of decade counters. This enables the system to be more stable, though at some sacrifice of positioning accuracy. Otherwise, if the controlled motion does not stop instantly when power is shut off, and the over travel exceeds the null band, the system would simply hunt or cycle about the control point.

In the embodiment illustrated, the system may have a resolution of one count and a memory capacity of 1,000 counts. However, simply by extending the length of the cam on the 1,000's wheel of each counter to cover the 0 through 4 positions, the memory capacity is increased to 5,000 count. Moreover, the addition of each counter wheel, assuming a decade counter is used, increases the memory storage by a factor of ten, without reducing sensitivity or resolution.

While the counting devices illustrated are of the simple decade counter type, any intermittent motion device, such as a geneva drive could be adapted as a counting device, though not necessarily a decade counter. Moreover, the counter digits referred to herein are merely by way of illustration and are not essential to the function of the "counting device." Such a device within the meaning of the invention comprises a plurality of coupled intermittent motion drives that will accept a continuous input into the first stage, generate some fractional rotation of the second stage with a complete rotation of the first, some fractional rotation of the third stage with a complete rotation of the second, etc. These devices differ from a standard gear set in that all stages including the first stage, move at the same velocity, even though they move only some fraction of a revolution.

While the drive motor 36 is shown as an electrical motor, it is obvious that any suitable power source may be employed, such as hydraulic or pneumatic motors and it is apparent from the embodiment of FIG. 3 that a rotary drive is not essential to the system and the feedback may be taken from simple linear drive such as a hydraulic or pneumatic cylinder. It is further contemplated that electrical switches could be replaced by a fluid power incremental drive which would allow digital control from this system in environments where electricity was not available or could not be used.

Referring again to FIGS. 2 and 3, a second counter mechanism 54 may be driven directly from the drive motor 36 or the driven pinion 48 to check the accuracy of the system. For example, after completion of all or a predetermined portion of the movement commanded from the computer 14, it may be determined that a given number of counts should be indicated by the counter 54. Confirmation that this has been done could be indicated by another cam 58 at a predetermined location on the counting device to actuate a suitable signal through a switch 60.

Figure 6:
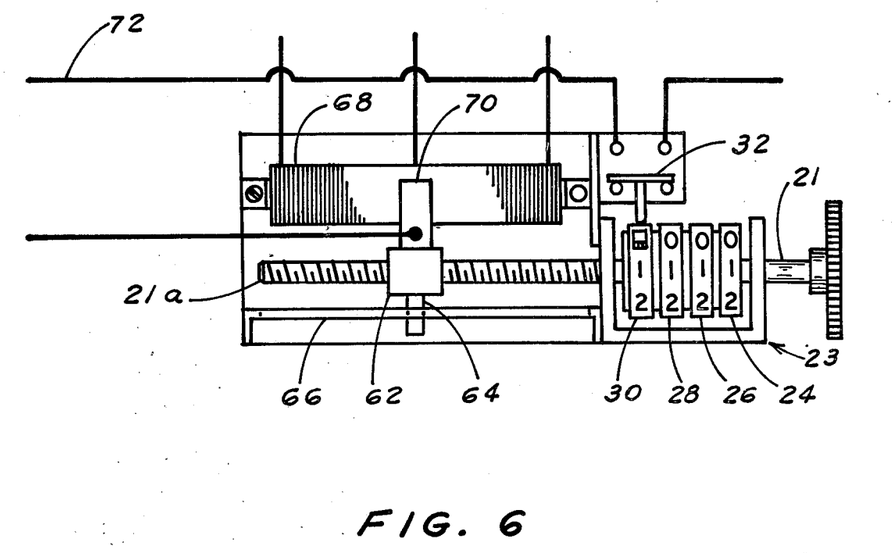
FIG. 6 is a schematic illustration of a second embodiment of this invention.

The Embodiment of FIG. 6

Referring now to FIG. 6, there is shown an embodiment wherein the mechanical counter mechanism 23 previously described could be utilized to generate not only an on-off signal but to make such signal proportional to the differential between input and feedback. For this purpose, a threaded extension 21a of the counting wheel shaft 21 extends beyond the casing and carries a nut 62 threaded thereon. An arm 64 carried on the nut is received in a slotted guide 66 which prevents rotation of the nut but enables it to move axially along the threaded rod. Mounted alongside of the threaded rod is a linear variable potentiometer 68, the wiper arm of which 70 is carried on the threaded nut. Hence, when the last stage 30 of the counting device 21 is moved from its null position to the next advanced position, the limit switch 32 is closed as previously described. In addition, as the counter shaft turns further and further from its null position, indicating a greater input signal to be answered, the nut 72 is moved further along the threaded rod 21a, to increase the electrical signal proportionately, producing a more rapid drive output.

Figure 7:
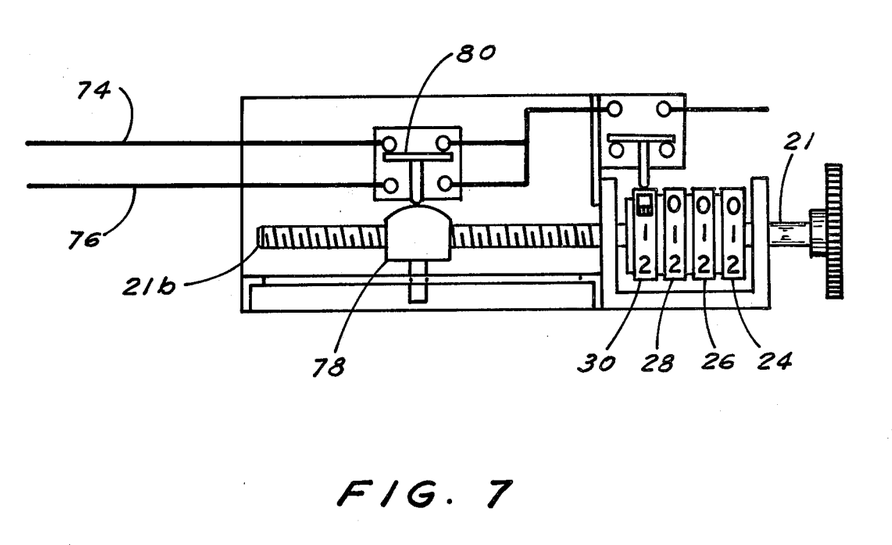
FIG. 7 is a schematic illustration of still another embodiment of this invention.

The Embodiment of FIG. 7

In the embodiment of FIG. 7, the potentiometer is replaced with a second limit switch 80 which selectively energizes either a low speed circuit 74 or a high speed circuit extention 76 and, if the counter moves from its null position, it moves a nut 78 along the threaded shaft 21b. If the displacement of the nut from its null position is sufficient to move it out from under the switch 80, the switch drops from its normal low speed configuration in line 74 to energize a speed drive 76, again accelerating the drive response.

Figure 8:
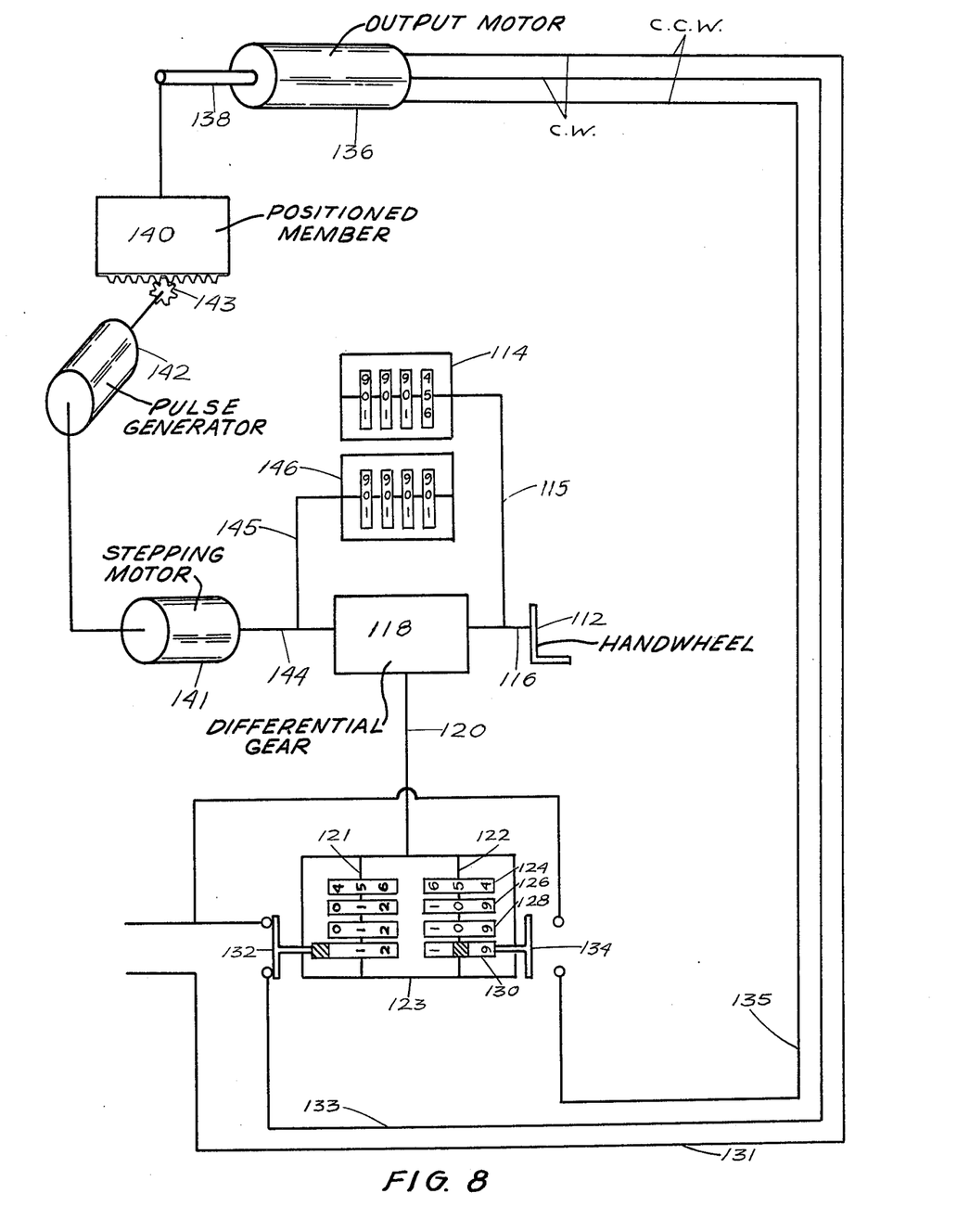
FIG. 8 is a schematic diagram of another embodiment of this invention including a manually controlled means for positioning a device remotely.

The Embodiment of FIG. 8

In this embodiment, the incremental input drive is simply a handwheel 112 which enables an operator to command a single stage movement of a device 140 by dialing in the number of increments of movement on a counting device 114 through a suitable drive connection 115. This dialed input is transmitted at 116 to the differential gear box 118 which, as in the embodiment of FIG. 1, drives the counter assembly 123 to close either switch 132 or switch 134, in the manner previously described, to drive output motor 136 either clockwise or counter clockwise.

In this embodiment, as in the embodiment of FIG. 1, the input to the differential gear 118 may be answered or opposed by a stepping motor 141 which is driven by a pulse generator 142 that is connected to a feedback means 143 from the positioned member 140. The stepping motor is connected at 144 to drive the differential gear 118 and through means 145 to drive a counter, which will give a reading that the command has been answered when the control counter assembly 123 against reaches its null position.

While this invention has been described in conjunction with preferred embodiments thereof, it is obvious that modifications and changes therein may be made by those skilled in the art without departing from the spirit and scope of this invention, as defined by the claims appended hereto.

What I claim as my invention is:

1. A digital control system comprising:
   a differential gear device;
   an incremental rotational, bi-directional input drive connected to drive said differential gear device to a selected rotary position;
   a bi-directional output drive adapted to move a member to a selected position determined by the rotary position selected by the input drive;
   a feedback drive means activated in response to operation of said output drive and connected to drive said differential gear device in opposition to said input drive;
   first and second multi-stage progressive intermittent drive devices wherein in each said device, a complete revolution of each stage produces a partial revolution, incremental movement of the next succeeding stage;
   said differential gear device being connected to drive said first and second progressive intermittent drive devices in opposite advancing and receding directions;
   first and second activators, each operative when engaged to activate said output drive in one of two opposite directions; and
   first and second actuating means, each on an actuating stage of one of said intermittent drives other than the first stage thereof, positioned to engage respectively said first and second activators upon a single advancing incremental movement of said actuating stage and to disengage said activator upon reversal of said incremental movement;
   said progressive intermittent drive devices each being initially set in a null position wherein a partial revolution of said first stage thereof in an advancing direction only will produce an incremental movements of subsequent stages thereof, including said actuating stage.

2. The digital control system defined by claim 1 wherein:
   said input drive comprises;
   manually operated drive means.

3. The digital control system defined by claim 1 wherein said input drive comprises;
   a handwheel; and a first counter device driven by said handwheel for displaying the number of increments of movement delivered by said handwheel.

4. The digital control system defined by claim 1 including:
a first counter device driven by said input drive; and
a second counter device driven by said feedback means.

5. The digital control system defined by claim 1 wherein said feedback drive means comprises:
a second incremental rotational, bi-directional drive;
a feedback power signal generator to deliver input signal pulses to activate said second incremental drive;
said generator being operated by one of said output drive and said driven member.

6. The digital control system defined by claim 1 wherein:
said incremental input drive is adapted for connection to and activated by a power signal source for delivery of input signal pulses.

7. The digital control device defined by claim 6 wherein:
said incremental rotational drive comprises:
a bi-directional electric stepping motor; and
said power source is operable selectively to drive said stepping motor in either rotational direction.

8. The digital control system defined by claim 1 wherein:
said progressive drive devices comprise:
multi-wheel counting devices; and
said actuating means are carried at a fixed position on the last stage wheel; and
said counting devices being initially set at null positions wherein the first stage wheels will advance the second stage wheels after no more than one-half revolution, the last stage wheels are at the positions next proceeding said fixed position and all other stage wheels are in positions to generate an incremental movement of the next succeeding stage wheel with a single incremental movement thereof.

9. The digital control system defined by claim 1 wherein:
said first and second activators comprise switches positioned adjacent said counters; and
said first and second actuating means comprise cams engageable with said switches when positioned opposite thereto.

10. The digital control system defined by claim 8 wherein:
said output drive includes an electric motor;
said first and second activators comprise switches which, when closed, energize said motor; and
said first and second actuating means comprise cams operable to close said switches when positioned opposite thereto; and including;
means on said counting devices for increasing the electric current to said motor proportionate to the displacement of said counting devices from the null positions thereof.

11. The digital control system defined by claim 6 wherein:
said first stage wheels in null positions are at a position to advance the second stage wheels after less than one-half revolution thereof.

* * * * *